July 23, 1946.  F. G. KEAR  2,404,501

RADIO BEACON SYSTEM

Filed Jan. 27, 1942

Inventor
Frank G. Kear

By Samuel Scrivener Jr.
Attorney

Patented July 23, 1946

2,404,501

UNITED STATES PATENT OFFICE 2,404,501

RADIO BEACON SYSTEM

Frank G. Kear, Washington, D. C., assignor to Washington Institute of Technology, Inc., Washington, D. C.

Application January 27, 1942, Serial No. 428,424

7 Claims. (Cl. 250—11)

This invention relates, generally, to radio beacon systems and, more particularly, is intended to provide a beacon system embodying a radiated directional field and means for receiving the field and producing from received energy due thereto indications providing a true beacon course from any point in space to the source of radiations.

It is an object of the invention to provide, in a beacon system of the type described, a new type of radiated field which will be a directional field rotating in azimuth about the source of radiations and having step-by-step modulation impressed thereon, this modulation being such that during passage of the rotating field through successive discrete zones different characteristic modulations will be impressed thereon, thereby characterizing each of such zones.

It is also an object of the invention to provide a complete radio guidance system by providing means for receiving the described rotating directional field and producing from received energy due thereto a left-right zero-center or other desirable course indication which may be observed to provide a true beacon course from any point in space to the source of radiations.

Other objects and features of novelty of the invention will be made apparent by the following description and the annexed drawing, it being understood, however, that such description and drawing are only illustrative of the invention, for the limits of which reference must be had to the appended claims.

Referring to the drawing, in which the same reference numerals and letters refer to like parts, Fig. 1 shows diagrammatically the method of transmission according to the invention;

Figure 1:
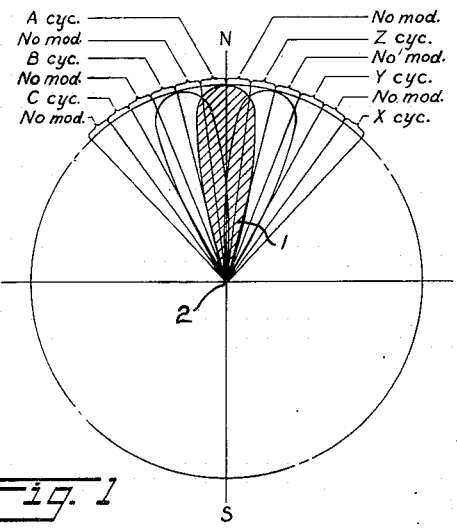

By this invention I provide a novel radio transmitting means and method and a novel radio receiving means and method which produces from received energy due to the radiated field a continuous indication of adherence to or deviation from a true beacon course between any point in space and the source of radiations. The radiating part of the guidance system consists of an elongated directional field 1 preferably having somewhat the shape shown in Fig. 1 which is caused to rotate by mechanical or electrical means about the source of radiations 2. The rotation should be at a uniform rate and is preferably at a low angular velocity, for example 12 to 30 R. P. M. A modulation, which may be an audio frequency tone, is impressed on the field over alternate zones of its rotary movement, the modulation changing in each successive zone. Thus, if the rotation begins with the maximum of the field along a N—S line, as shown in Fig. 1, a modulation of A cycles may be impressed on the field during its rotation from 0° to 5° in a counter-clockwise direction. From 5° to 10° no modulation is impressed, from 10° to 15° a modulation of B cycles is impressed, from 15° to 20° no modulation, from 20° to 25° a modulation of C cycles, and so on through the 360° travel of the field, the same modulation always being impressed during travel through the same zone. There are thus produced, in the example given, thirty-six discrete areas or zones in which a characteristic modulation periodically exists.

Figure 2:
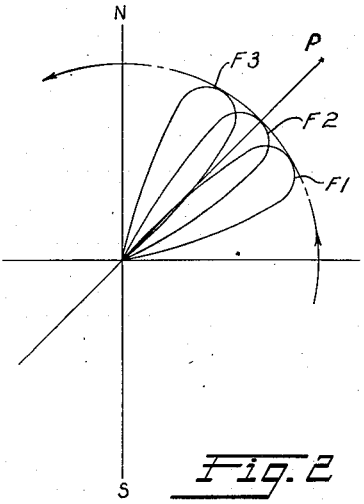
Fig. 2 shows diagrammatically the fields which may be utilized at any point in space to produce a beacon course indication.

Reference to Fig. 2 will show that at any point in space P there will be received characteristic modulation frequencies differing in magnitude to a degree determined by the directional pattern. Thus, at point P of Fig. 2, which is within the zone in which the field is modulated by audio frequency F2, modulation frequency F2 will be received with maximum amplitude and modulation frequencies F1 and F3 with lesser amplitudes, which will be equal if point P is equi-distant between the zones of modulations F1 and F3. It will be apparent that observation, at any point in space, of the frequency having maximum amplitude will make known at once the approximate azimuthal direction of a line between the source 2 and the point in space.

Figure 3:
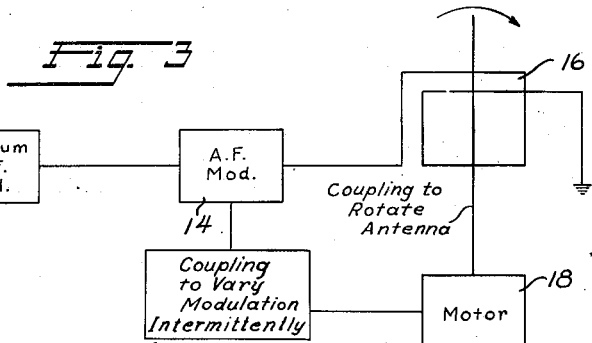
Fig. 3 shows schematically a system for producing the type of radiation shown diagrammatically in Figs. 1 and 2.

A transmitting system for establishing the described field is shown schematically in Fig. 3 and comprises a source of radio frequency energy 10, an intermediate frequency modulator 12, an audio frequency modulator 14, a rotatable directional antenna 16 and a motor 18 which is connected to rotate the antenna and the audio frequency modulator synchronously, to thereby cause the modulation impressed on the radiated field to change as the field passes through the successive, separated zones in which it is modulated.

Figure 4:
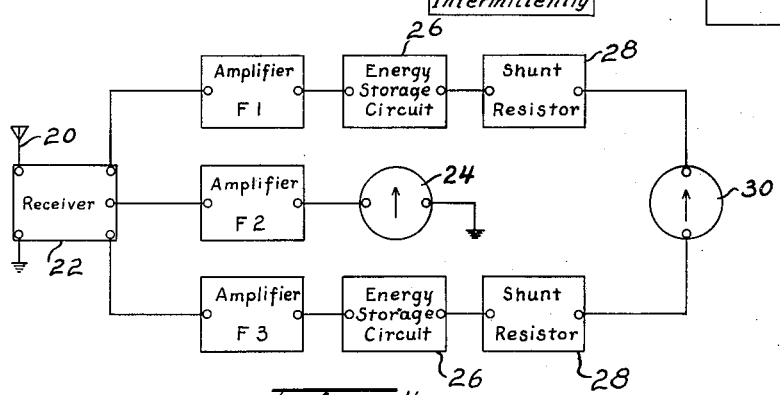
Fig. 4 shows schematically a system according to the invention for receiving the invented type of radiated field and producing a course indication.

The receiving and indicating means of this invention are illustrated schematically in Fig. 4 of the drawing and comprise a non-directional antenna 20 which is connected to the input of a radio receiver 22, the output of which is supplied to three selective amplifying channels F1, F2 and F3 each of which is capable of being tuned to any of the modulation frequencies A, B, etc. which characterize the rotating field. The output of amplifier F2 is connected to an indicating instrument 24 which is capable of indicating the amplitude of the signal received by amplifier F2. Amplifiers F1 and F3 are connected through energy storage circuits 26 and shunt resistors 28 to the opposite terminals of a zero-center, left-right indicating instrument 30 which is preferably of the milliammeter type.

In the operation and use of the described beacon system the transmitting part thereof is caused to operate in the described manner. The receiving means, which may be located at any point in space P is caused to provide indication of adherence to or deviation from a true beacon course between point P and source 2 by first causing the selective circuit F2 to pass through each of the modulating frequencies employed until that of maximum amplitude is found by reference to indicator 24. The selective circuits F1 and F3 are then switched to the modulating frequencies which are, respectively, just above and just below that of maximum amplitude and to which amplifier F2 has been tuned. These frequencies F1 and F3, being supplied to the opposite terminals of the indicator 30, will cause deflection thereof in a known manner to indicate any change in the relative amplitudes of the two frequencies and, therefore, any deviation from a true beacon course toward or away from the source 2.

It will be obvious that any frequencies to which the channels F1 and F3 are tuned will only be present for a small portion of the total time and the storage circuits 26 are therefore provided to cause a steady deflection of the indicator 30.

It will be apparent that the point P will not usually be located equi-distant between two zones of modulation and will, therefore, usually be so located that the amplitudes of modulation frequencies F1 and F3 at the point are different. Obviously, a true beacon course through such a point would not produce a zero-center on-course indication at 30. In order to produce a zero-center indication when on course, the shunt resistors 28 (so-called deviometers) are provided in the output of each amplifier and may be operated to adjust to equality the relative intensities of the modulating frequencies F1 and F3. With the use of these deviometers it is possible to secure a course in space through any point whatsoever when only a finite number of modulating frequencies are employed, as described.

While I have described and illustrated but one embodiment of my invention, it will be understood by those skilled in the art that modifications and changes therein may be made and different embodiments found without departing in any way from the spirit and scope of the invention, for the limits of which reference must be had to the appended claims.

I claim:

1. A radio guidance system comprising means for radiating a directional field, means for rotating the field in azimuth about the source of radiations, means for impressing on said field a series of different modulations each of which is impressed only during the rotation of the field through a limited arc, means for receiving said field, means for indicating the modulation having greatest amplitude at the location of the receiving means, other means operable to be responsive only to modulations impressed in the zones on either side of the zone in which occurs the modulation having greatest amplitude at the location of the receiving means, and means for producing an indication of the difference of the amplitudes of the received energy due to the modulations in the zones on either side of the zone in which occurs the modulation having greatest amplitude at the location of the receiving means.

2. A radio guidance system according to claim 1, in which the modulations impressed on the radiated field are audio frequency tones.

3. A radio guidance system according to claim 1, in which the limited arc within which each modulation is impressed on the radiated field is separated from adjacent arcs within which other modulations are impressed on the radiated field by arcs of movement of the radiated field within which no modulation is impressed thereon.

4. A radio guidance system for indicating the course from a point in space to the source of a rotating directional field on which are impressed different modulations each of which exists only throughout the travel of the field through a limited arc of rotation, the arcs of rotation within which such modulations occur being spaced equally throughout the circle of rotation of the field and being separated by arcs of rotation of the field within which no modulation is impressed thereon, comprising means located at the point in space for receiving the field, means for indicating from received energy due to the field the modulation which at the location of the receiving means has greatest amplitude, means adjustable to be responsive respectively to one of the two modulations occurring within arcs of rotation on either side of that within which occurs the modulation which at the location of the receiving means has greatest amplitude, and means for indicating the algebraic sum of the amplitudes of said two modulations at the location of the receiving means.

5. A radio guidance system according to claim 4, in which energy storage means are provided between the indicating means and each of the means which are responsive, respectively, to one of said two modulations.

6. A radio guidance system according to claim 4, in which there is provided between the indicating means and each of the means which are responsive, respectively, to one of said two modulations means for adjusting to equality the received energy due to said two modulations.

7. The method of radio direction finding which consists in rotating a directional radiated field in azimuth about the source of radiations, impressing a series of modulations of different frequencies on said field, each of which is impressed on the field within one of a plurality of spaced arcs of rotation of its circle of travel, receiving said field at a point in space, determining the modulation having greatest amplitude at such point, and producing a course indication which is the difference of the amplitudes of the modulations existing in arcs of rotation on either side of that in which occurs the modulation of greatest amplitude at such point.

FRANK G. KEAR.